Sept. 6, 1966 D. A. BURROWS 3,271,538
SERVO SYSTEM INDICATOR-CONTROLLER
Filed April 3, 1964 5 Sheets-Sheet 1

INVENTOR
DAVID A. BURROWS
BY Bilker + Moyerman.
ATTORNEYS.

Sept. 6, 1966  D. A. BURROWS  3,271,538
SERVO SYSTEM INDICATOR-CONTROLLER
Filed April 3, 1964  5 Sheets-Sheet 2

INVENTOR
DAVID A. BURROWS

BY Bilker + Moyerman

ATTORNEYS.

Sept. 6, 1966 D. A. BURROWS 3,271,538
SERVO SYSTEM INDICATOR-CONTROLLER
Filed April 3, 1964 5 Sheets-Sheet 3
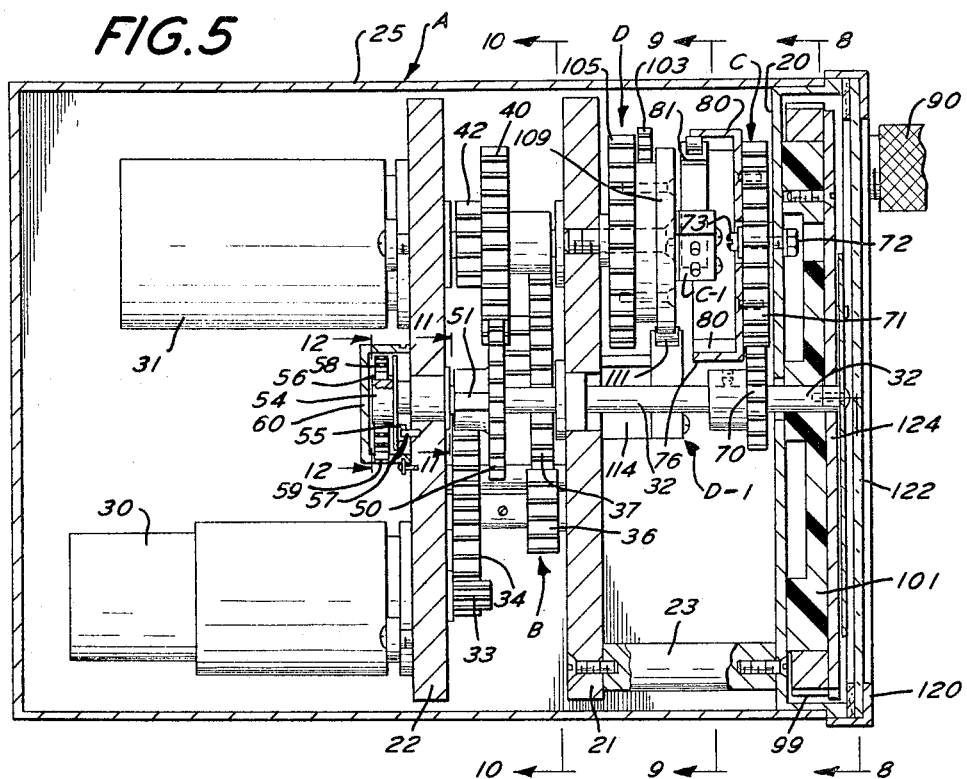
FIG.5
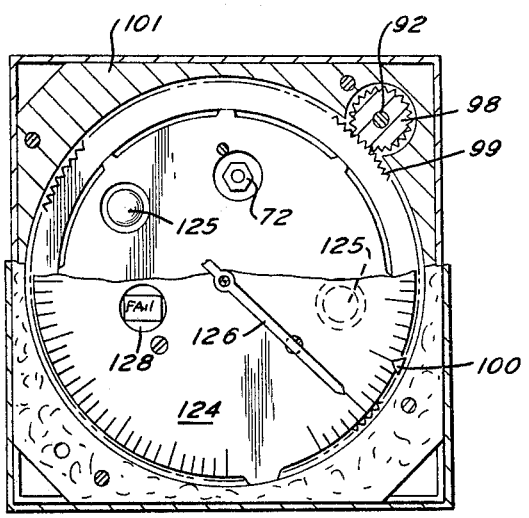
FIG.8
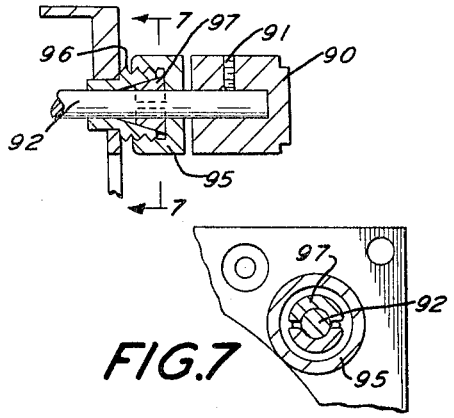
FIG.6
FIG.7
INVENTOR
DAVID A. BURROWS
BY Bilker + Moyerman
ATTORNEYS.

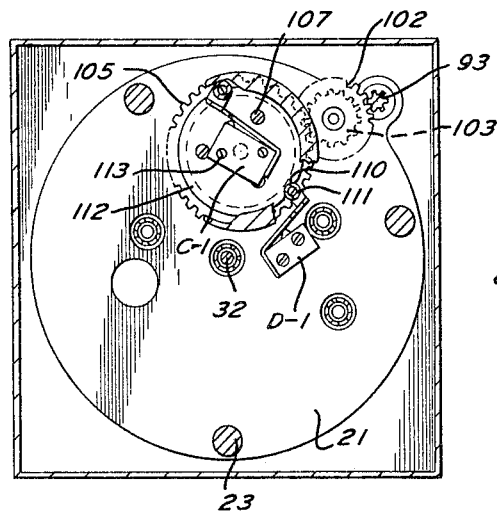
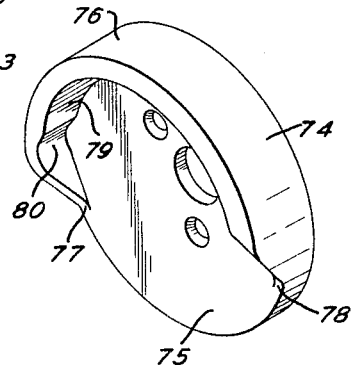
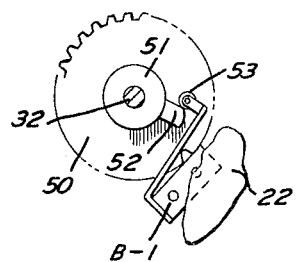
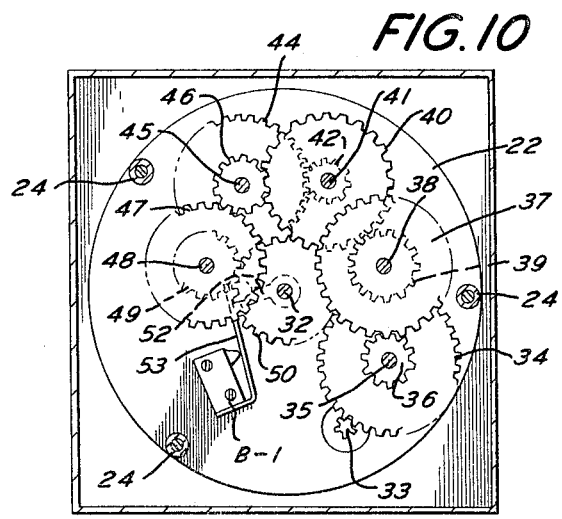
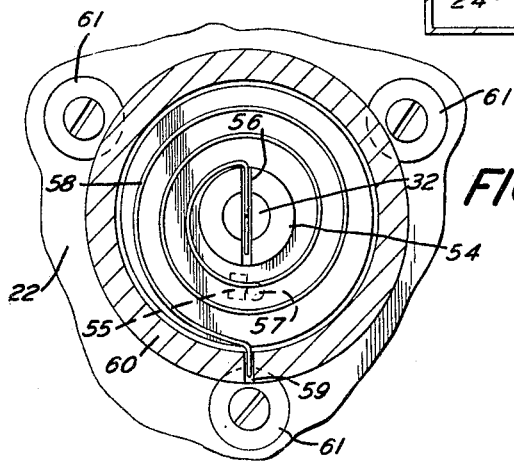
INVENTOR
DAVID A. BURROWS
ATTORNEYS.

Sept. 6, 1966 D. A. BURROWS 3,271,538
SERVO SYSTEM INDICATOR-CONTROLLER
Filed April 3, 1964 5 Sheets-Sheet 5

INVENTOR
DAVID A. BURROWS

BY Bilker + Moyerman
ATTORNEYS.

— # United States Patent Office 3,271,538
Patented Sept. 6, 1966

3,271,538
SERVO SYSTEM INDICATOR-CONTROLLER
David A. Burrows, Coral Gables, Fla., assignor to Rex Systems Corporation, a corporation of Florida
Filed Apr. 3, 1964, Ser. No. 357,106
12 Claims. (Cl. 200—52)

This invention pertains to indicator-controllers for servo systems. More particularly it pertains to indicators which work in conjunction with a servo loop to give "read outs" of parameters which are proportional to servo motion and which, simultaneously, may provide controls and limits for operation of the system.

Applications of servo systems are widespread and require, as a starting point, only a measuring device or sensor which puts out a D.C. voltage proportional to the parameter being measured or controlled. Typical exemplary applications include radar altimetry, inertial navigation, radar fire control, mechanical position or attitude indicators and automatic pilots. The direct current input voltage is customarily amplified and fed to a servo controller. The controller feeds the amplified voltage to a servo motor, thereby causing it to change its rotational position. At the same time, motor rotation mechanically positions a null point potentiometer to create a balancing voltage which is reflected back to the controller and causes cessation of motor motion until the value of the direct current input again changes. Such a typical system, as used in connection with altitude adjustment of bomb sights, is described in detail in U.S. Patent No. 3,005,938 which is incorporated herein by reference.

In the past any read out of input voltages have been achieved through calibrated voltmeters or ammeters. Such meters are delicate and, of necessity, have a limited range and accuracy. Further, they do not lend themselves to the performance of switching or controlling functions. Additionally they provide no fail-safe operational signals such as are necessary in flight guidance controls.

Accordingly, it is an object of this invention to provide an indicator-controller for servo systems which will permit direct numerical read out of parameters giving rise to the servo input voltages.

An additional object of the invention is to provide an indicator-controller which is particularly suitable for use in connection with terrain avoidance systems.

It is also an object of the invention to provide an indicator-controller including integral means for on-off activation of a servo controller and supplemental means indicating when said servo controller is operating.

It is additionally an object of the invention to provide an indicator or controller which is quickly set for operation within any desired portion of its total indicating range and which gives visual indication of the operational range limits so selected.

Still another object of the invention is to provide an indicator which gives full scale linear indication or, alternatively, a combination of linear-logarithmic indication.

A further object of the invention is to provide an indicator wherein there is no dial indication unless and until the servo unit is operating.

It is also an object of the invention to provide, in conjunction with an indicator-controller, instantaneous test means for determining operativeness of the overall system.

Among other objects of the invention is the provision, in connection with indicator-controllers of the type described, means for displaying fail-safe warnings if the measured parameter exceeds either the maximum range of the indicator or the operational range which has been selected by the operator.

It is also an object of the invention to provide an indicator-controller which is rugged in construction, extremely sensitive and accurate in operation, relatively maintenance free, light in weight, small in size, easily and economically produced and highly efficient in operation.

These and other objects of the invention will be apparent to those skilled in the art from the disclosure in the following specification, appended claims and drawings wherein:

FIGURE 5 represents a fragmentary section taken along line 5—5 of FIGURE 1.

FIGURE 6 represents a section taken along line 6—6 of FIGURE 1.

FIGURE 7 represents a partial section taken along line 7—7 of FIGURE 6.

FIGURE 8 represents a section taken on line 8—8 of FIGURE 5.

FIGURE 9 represents a section taken on line 9—9 of FIGURE 5.

FIGURE 10 represents a section taken on line 10—10 of FIGURE 5.

FIGURE 11 represents a fragmentary section taken on line 11—11 of FIGURE 5.

FIGURE 12 represents a section taken on line 12—12 of FIGURE 5.

FIGURE 13 represents an isometric view of a cam used in connection with the variable high-limit mechanism.

Figure 1:
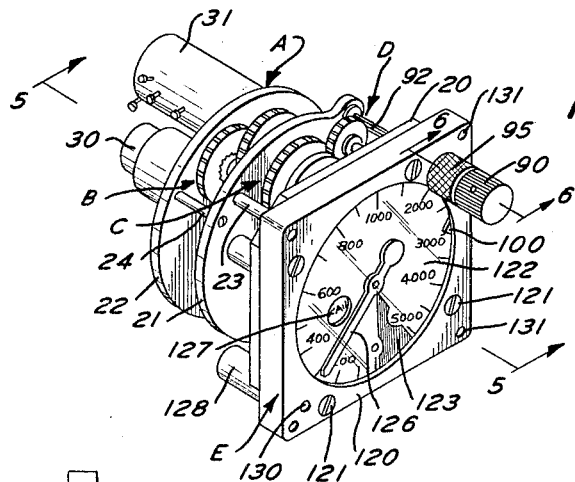
FIGURE 1 represents a perspective view of an indicator-controller of the invention with its housing removed.

Referring now to the drawings, wherein like reference numerals designate like parts, it will be observed that the unit comprises a housing A within which is mounted a servo gear train B and its related fixed limit switch B–1; an interrelated ancillary gear train C and its associated variable limit switch C–1 and an on-off range-set gear train D and its associated switch D–1. Face plate assembly E provides read out means and a plurality of fail-safe mechanisms. These components and sub-combinations will now be discussed in detail.

(A)—Housing

As best shown in FIGURES 1 and 5, the housing A comprises a bezel support plate 20, an intermediate bearing plate 21, and a rear bearing plate 22. Bearing plate 21 may be mounted on plate 20 with a plurality of peripherally distributed spacer-supports 23 and, in a similar manner, plate 22 may be mounted on plate 23 with a plurality of spacer-supports 24. The entire housing may be enclosed by a removable case 25 frictionally engaged upon the perimeter of plate 20. As will be discussed later, face plate assembly E mounts upon the front of plate 20.

(B)—Servo gear train

The servo gear train B is generally located between rear plate 22 and intermediate plate 21. The general function of the train may be stated as the provision of means whereby a pointer drive shaft and a nulling potentiometer shaft may be both rotated as a function of the rotation of a servo motor and the train, further, activates a switch at a fixed rotational limit.

Figure 2:
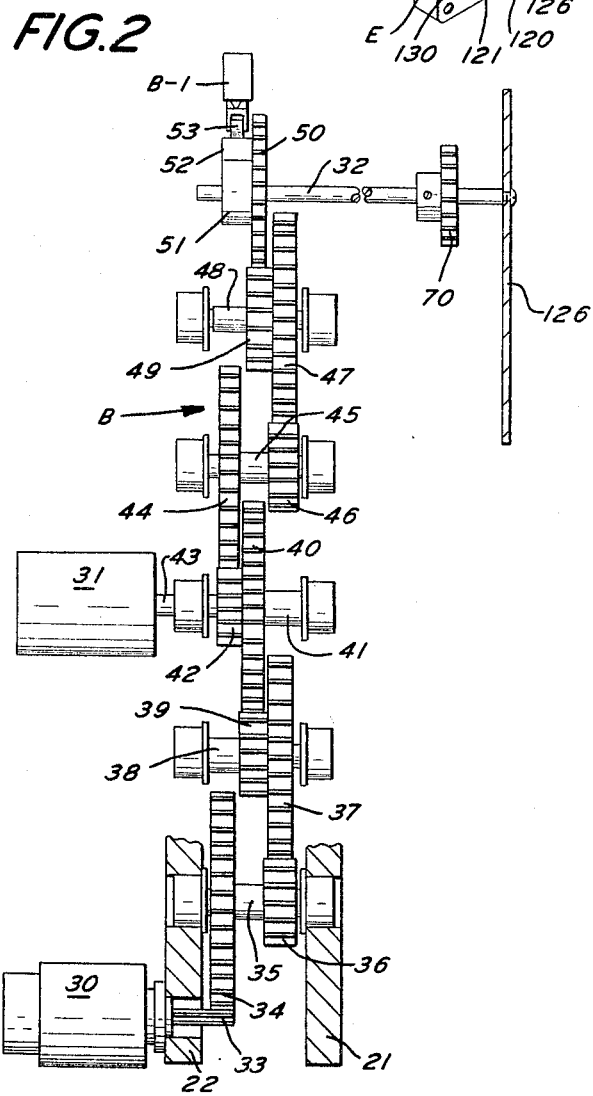
FIGURE 2 is a diagrammatic sectional representation of the primary servo gear train.

In FIGURE 2 the gear train is illustrated diagrammatically. Gear ratios and sizes as shown therein or as discussed in connection therewith are merely exemplary. Actual gear centers, in the embodiment of the invention which is shown in FIGURE 1, are best seen in FIGURES 5 and 10.

Turning now to FIGURE 2 it will be observed that the train is powered by servo motor 30, to drive both a nulling potentiometer 31 and a pointer drive shaft 32. In the process, at a fixed predetermined angular rotation, limit switch B-1 is activated. The servo motor shaft is provided with a splined end portion 33, which meshes with gear 34 to drive shaft 35, on which is also mounted gear 36. Gear 36 drives gear 37 and shaft 38, on which is also mounted gear 39. Gear 39 drives gear 40 and shaft 41, on which is also mounted gear 42. Shaft 41 is suitably coupled to shaft 43 of potentiometer 31 and its rotation changes the electrical resistance of the potentiometer as a function of the rotation of shaft portion 33. All of the shafts previously mentioned as well as those which will be mentioned in connection with this gear train are suitably journalled between plates 21 and 22. A suitable gear reduction ratio between the servo motor 30 and the potentiometer 31, when using a ten turn potentiometer, is 65:1.

The balance of the servo gear train, connecting shaft 41 and pointer shaft 32, comprises gear 44, which is driven by gear 43 and which is mounted on shaft 45 along with a gear 46. Gear 46 drives gear 47 and shaft 48, on which is also mounted gear 49. Gear 49 meshes with and drives gear 50, which is mounted on pointer shaft 32, and thus imparts rotary motion thereto. A preferred gear reduction ratio between shaft 41 (i.e. potentiometer) and shaft 32 (i.e. pointer) is 10:1.

As shown in FIGURES 5 and 10, where identical reference numerals have been used, the servo gear train may be arcuately distributed about shaft 32 to conserve space and miniaturize the apparatus.

As best shown in FIGURE 11, the rear of gear 50 is provided with a sleeve 51 including an integral projecting lug 52. The sleeve may be angularly positioned and set with respect to shaft 32 and is located on the shaft between gear 50 and the front of rear bearing plate 22. Limit switch B-1, which includes a resilient switch arm 53, is mounted on the front of plate 22. At maximum rotation of pointer shaft 32, lug 52 operatively engages switch arm 53 to cause switch action. In the embodiment illustrated, switch B-1 is normally-closed microswitch which opens at maximum pointer range with an effect which will be described below.

The servo gear train also includes a spring loaded failsafe negator arrangement which cooperates with switch B-1 to achieve the stated objects of the invention. As best seen in FIGURES 5 and 12, shaft 32 protrudes rearwardly through an aperture in plate 22. To the shaft is affixed a stop sleeve 54, including an integral forwardly-extending lug 55 and a rearwardly-extending spring retention slot 56. Plate 22 is further provided with a rearwardly extending stop pin 57, which cooperates with lug 55 to limit rotation of shaft 32 to substantially one revolution (i.e. one revolution less than angle occupied by the pin). As shown in FIGURE 12, lug 55 is in juxtaposition to pin 57 at the counterclockwise limit of rotation (i.e. maximum dial indication). Shaft 32 is spring biased to the position shown by coil spring 58, one end of which is seated in slot 56. The other end of spring 58 is seated in slot 59 in tensioner cover 60. Tensioner cover 60 may be rotated with respect to sleeve 54 to increase or decrease spring tension and, once proper tension has been achieved, may be angularly fixed with respect to plate 22 by a plurality of clamping screws 61.

The negator arrangement causes pointer shaft 32 to rotate to its limit of travel whenever motor 30 fails to exert a counterbalancing force. Thus, for instance, full scale sweep would occur whenever there is power failure. This same action would, at the extreme of travel, cause lug 52 to operate switch arm 53. It can be seen that there will be operation of switch B-1 (a) at maximum rotation of shaft 32 as caused by the demands of motor 30 and (b) when conditions exist such that spring 58 causes shaft 32 to turn to its stop limit.

*(C)—Ancillary gear train*

The ancillary gear train C is, as shown in FIGURE 1, located between bezel support plate 20 and intermediate support plate 21. Its function, briefly, is to rotate a switch-activating cam in proportion to the rotation of pointer shaft 32, thus performing an angular information transfer function.

Figure 3:
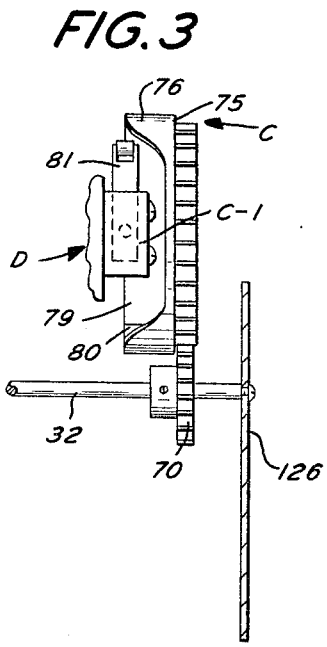
FIGURE 3 is a diagrammatic fragmentary sectional representation of the ancillary gear train used for setting the variable high limit of the device.

The gear train is shown diagrammatically in FIGURE 3 and cam details are shown in FIGURE 13. FIGURE 5 shows the actual orientation of ancillary gear train components in the embodiment pictured in FIGURE 1.

Turning now to FIGURE 3, it will be observed that a gear 70 is mounted on pointer shaft 32 and rotates with it. This gear, in turn, drives gear 71 which is mounted on plate 20 as with a stud shaft 72. Affixed to the rear of gear 71, as with screws 73, is a function transfer cam, generally 74. As shown in FIGURE 13, the cam has a circular base portion 75 and an arcuate milled lip 76 extending between two peripheral points 77 and 78. The inside surface 79 is provided with transitional faces 80 at each end.

Variable limit switch C-1, which is rotatably mounted upon a component of gear train D, includes a resilient switch arm 81. This arm is adapted to ride on surface 79 and when it is in contact therewith, between faces 80, activates switch C-1. The cam is cut so that the distance between 77 and 78 along the periphery of portion 75 (i.e. that arc where no lip exists) represents the total angular distance moved by the cam 74 for one revolution of shaft 32. Consequently it is possible for cam 74 to experience its full range of rotation without having any operative effect on switch arm 81. Thus, for instance, where C-1 is a normally-closed microswitch, as it is in the embodiment shown in FIGURE 1, conditions could exist where it would remain closed through full scale rotation of shaft 32 and the entire ancillary gear train C have no effect whatsoever.

However, as indicated above, switch C-1 is rotatably mounted on a component of gear train D and it is obvious that only for certain angular positions of arm 81 will there be no contact with surface 79. The nature of the transfer function of cam 74 will become apparent as the on-off range-set gear train D is discussed below.

*(D)—On-off range-set gear train*

This gear train is located between intermediate bearing plate 21 and bezel support plate 20. It is shown diagrammatically in FIGURE 4 and its details, as embodied in the device of FIGURE 1, are shown in FIGURES 5 to 9 inclusive.

Both on-off and set-range action are controlled by knob 90 which is mounted, as with set screw 91, on control shaft 92. Shaft 92 has a splined terminal porton 93 and is appropriately journalled, as at 94, in plate 21 and in plate 20 through which it passes. While knob 90 can be freely rotated it can also be set against vibrational and other random movement using knurled lock nut 95. This nut is mounted on the external threads of internally tapered locking sleeve 91 and, as it is tightened, applies a shaft wedging force to a tapered split-ring 97.

A range indicating gear 98 is mounted on shaft 92 between plate 20 and face plate assembly E. This gear meshes with ring gear 99 which, consequently, rotates as shaft 92 is rotated by knob 90. Affixed to the ring gear is a bug pointer 100 which provides range-set indication in conjunction with a suitable dial. The gear is kept in coaxial alignment with pointer shaft 32 by a suitable spider spacer bearing 101.

Figure 4:
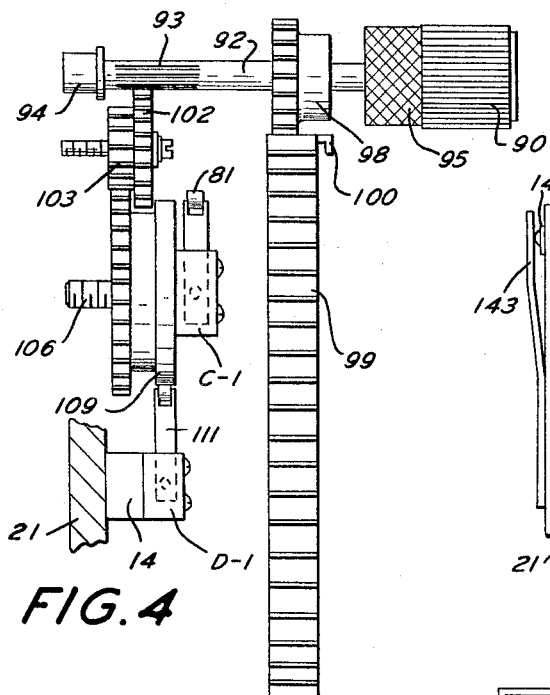
FIGURE 4 is a diagrammatic fragmentary sectional representation of the on-off range-set gear train and related switches.

Splined shaft portion 93 drives the range-set on-off gear train, which comprises gears 102 and 103, mounted on a common stud shaft 104, and a gear 105 mounted on shaft 106. Shafts 104 and 106 are mounted in plate 21. As can be seen in FIGURE 4, rotation of shaft 92 causes rotation of gear 105. Mounted on gear 105, as with screws 106, is an adapter cam plate, generally 108. This generally circular stepped plate includes an on-off peripheral edge 109 having a groove or slot 110 adapted to receive resilient arm 111 of on-off switch D–1. As shown in FIGURE 9, arm 111 is resting within groove 110. Arm 111 contacts edge 109 at all times but only in one position (i.e. that shown in FIGURE 9) is any angular motion of the arm possible. In the embodiment shown in FIG. 1 et seq. the switch is normally-open and thus is closed and in the "on" position at all times except when the end of the arm is in groove 110. The face 112 of plate 108 serves as a base for switch C–1 which is mounted thereupon as with screws 113. As the knob 90 is rotated, therefore, cam plate 108 rotates and switch C–1 is rotated with respect to shaft 106. No rotational movement of switch D–1 occurs, however, since this switch is mounted on spacer block 114 which is affixed to intermediate bearing plate 21.

In the last portion of the discussion of the ancillary gear train it was indicated that switch C–1 would be out of contact with surface 79 for one revolution of shaft 32 unless its angular orientation is changed. Having now disclosed how movement of knob 90 can, in fact, change the angular orientation of switch C–1 it will be apparent that cam plate 108 and function transfer cam 74 integrate the motion of pointer shaft 32 and the position of control shaft 92 to vary the angular closure range of C–1.

(E)—Face plate assembly

The face plate assembly E gives a numerical read out of shaft position and further gives visual indicia of system operativeness such as are commonly referred to as "fail-safe" indications.

The assembly comprises a bezel case 120, mounted on support plate 20, for instance, with screws 121. Retained on the case 120 is a transparent plate or lens 122 having a masked sector 123. A calibrated dial 124 is mounted behind the lens and the face of the dial may be edge illuminated by a plurality of dial lights 125. A pointer 126, mounted on the end of shaft 32, is located between lens 122 and dial 124 and is adapted to be concealed behind masked sector 123 when not indicating. The dial 124 is apertured, as at 127, to permit display of a spring loaded fail-safe indicator 128. These units are conventional ones such as are manufactured by Allard Instrument Corporation of Westbury, New York and described in section 3900 of "Electronic Engineers Master," 1962 edition. Basically, they are spring loaded electromagnetic displays which exhibit, for instance, "fail" under no-power conditions and which, when energized with the electromagnet operative to overcome spring tension, indicate "on." Although not actually a part of the face plate assembly, a trimmer potentiometer 129 may be mounted on the rear of plate 20 and screw-driver adjustment access to it had through an aperture 130 in case 120. A plurality of apertures 131 may be provided in case 120 for mounting the entire housing in a suitable instrument panel.

Figure 17:
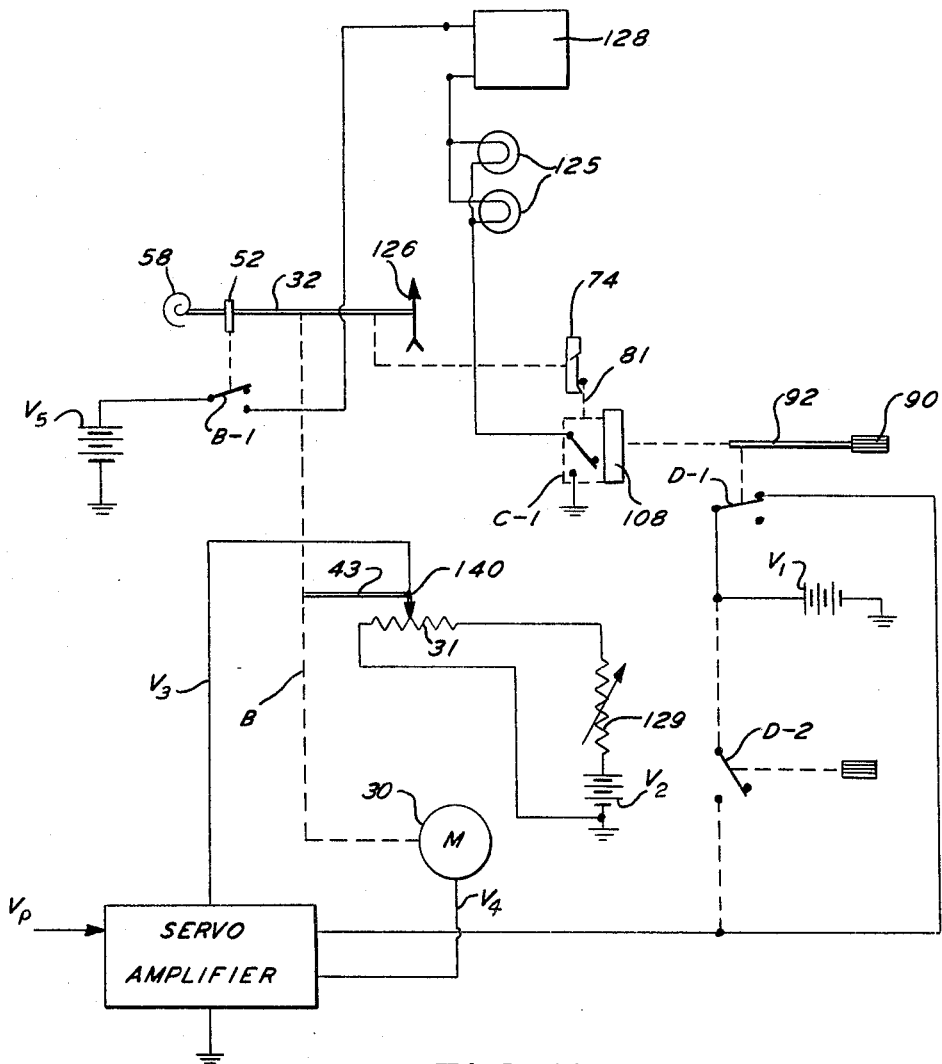
FIGURE 17 represents a generalized schematic electro mechanical diagram of an embodiment of the invention.

Before describing some modifications shown in the drawings, the modus operandi of the embodiment so far described will be detailed, with particular regard to FIGURE 17.

(F)—Operation

As indicated, a D.C. voltage $V_p$ which is proportional to the parameter being measured or controlled is fed as an input to a servo amplifier. The amplifier operating voltage $V_1$ is available only upon closure of on-off switch D–1 which occurs upon rotation of knob 90 so that arm 111 comes out of a slot 110. When this occurs, bug pointer 100 comes out from behind mask 123, becoming visible for the first time. Whenever pointer 100 is visible, switch D–1 is closed and the pointer thus acts as a visual indicia of switch closure as well as a visual quantitative indicator for the range-set function.

In FIGURE 17 an additional on-off switch D–2 is shown wired in parallel to switch D–1. This is a modification of the invention which will be discussed below in connection with FIGURE 14.

Operation of the servo amplifier is conventional, as detailed in the above-referenced patent and elsewhere. The amplifier puts out a voltage $V_4$ which causes rotation of servo motor 30 and gear train B. As the pick-off point 140 on the potentiometer 31 changes with rotation of shaft, a voltage $V_3$ (derived from a separate voltage source $V_2$) is fed back to the amplifier and nullifies voltage $V_4$ to cause motion to motor 30 to cease. Trimmer 129 is adjusted to make the range of $V_3$ equal to that of $V_4$.

With power on and the amplifier operating, pointer 126 will remain behind masked area 123 with lug 55 against pin 57 at the limit of rotation of shaft 32. Not until $V_p$ comes within maximum dial potential will needle 126 appear. At any time when the needle is behind the mask, normally closed fixed limit switch B–1 will be held open by the action of lug 52 on resilient switch arm 53. The instant the needle appears, however, lug 52 disengages and the switch closes. Were it not for C–1, which is wired in series with B–1, voltage $V_5$ would be henceforth always applied to lights 125 and fail-safe indicator 128 there would be simultaneous display of (a) needle 126 (b) illumination and (c) an "on" flag at 128. Closure of switch D–1 is already being indicated by pointer 100. On failure of power, tension from spring 58 drives shaft 32 to cancel indicia (a), (b) and (c). They would also disappear at any time that $V_p$ exceeds maximum range.

FIGURE 17 shows that switch C–1 exercises joint control of lights 125 and indicator 128 with B–1. When the range-set with knob 90 is the dial maximum, arm 81 never contacts cam surface 79 and always stays closed. However, setting of a range less than maximum dial range, by rotation of knob 90, results in a reorientation of switch arm 81 with respect to surface 79 so that it is free thereof only below the set point indicated by pointer 100. Therefore even though $V_p$ is within maximum indicator limit, needle 126 is indicating and switch B–1 is closed, dial lights 125 will be inoperative and indicator 128 will read "fail" unless and until the set point has been reached. One watching the indicator could thus pay scant attention to it until these two indicia go into action to indicate that the set point has been reached. Obviously the same circuit could include various alarm indicia and the various switches B–1, C–1 and D–1 can be used in connection with independent circuits as controls and limits.

(G)—Modified on-off arrangement

Figure 14:
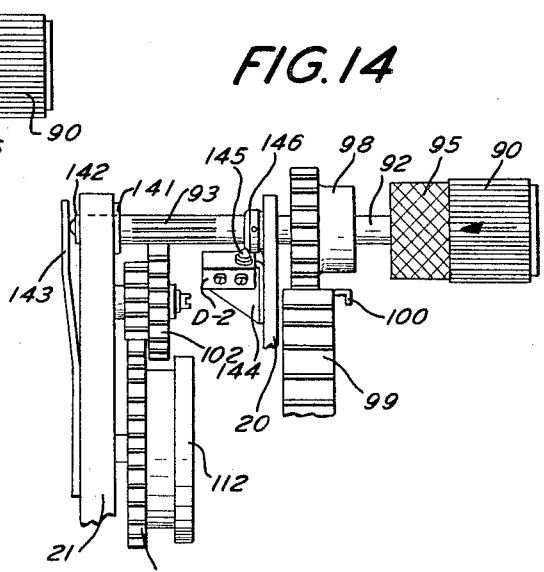
FIGURE 14 represents a modification of FIGURE 4 used where it is desired to make an instantaneous determination of the operativeness of the overall servo system.

As shown in FIGURE 14, the arrangement of FIGURE 4 can be modified so as to provide the potential for testing the servo system without repositioning pointer 100. Only those parts differing from those shown in FIGURE 4 will be discussed and are necessary for the modification.

Shaft 92 is made capable of reciprocation (as indicated by the arrows on knob 90) by choice of a suitable thrust-permissive radial bearing 141 mounted in plate 21. A collar 142 limits one extreme of shaft reciprocation. A spring arm 143, mounted on the rear of plate 21, resiliently abuts the end of shaft 92 and tends to keep collar 142 in juxtaposition to plate 21. A switch D-2, already discussed in connection with FIGURE 17, is mounted on plate 20, as with brackets 144. The switch arm 145 may be actuated by a beveled sleeve 145 mounted on shaft 92. Thus pushing knob 90 in closes switch D-2 and, on release of pressure, the switch opens as spring 143 disengages sleeve 146 and switch arm 145.

(H)—Modified dial indication

Figure 16:
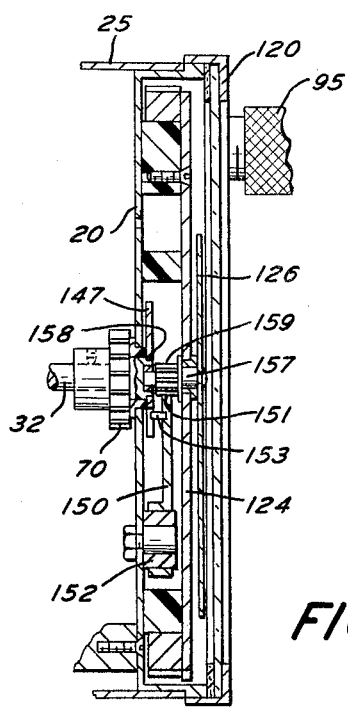
FIGURE 16 represents a section taken along line 16—16 of FIGURE 15.
Figure 15:
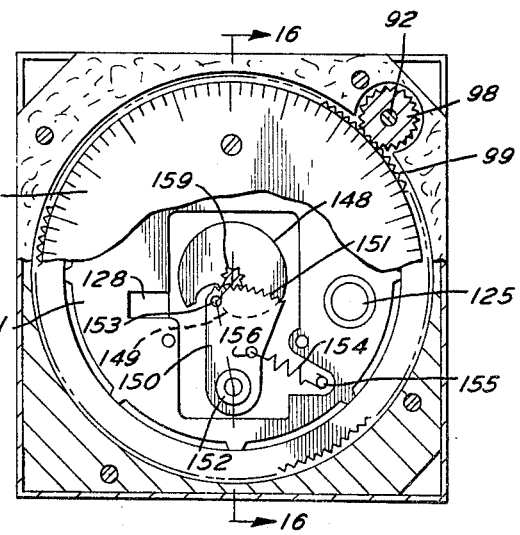
FIGURE 15 represents a partially broken away front view of a modified linear-logarithmic pointer control arrangement and generally represents a modification of FIGURE 8.

In the embodiment previously described the dial indication was linear throughout its range. That is, for a given angular motion of shaft 32 there was angular motion of pointer 126 in fixed proportional relationship. However, for measurement of certain types of parameters, it may be desirable to have linear motion of pointer 126 through a portion of its total excursion and logarithmic motion for the balance of the range. FIGURES 15 and 16 show an embodiment whereby this can be achieved. Only modified components will be discussed in detail since the balance of the construction is the same as that previously described.

The pointer drive shaft 32 is abbreviated and terminates just forward of support plate 20, through which it is journalled. Mounted on shaft 32 is linear-logarithmic cam which rotates with the shaft. The cam includes a plurality of surfaces which develop linear or logarithmic motion such as, for instance, logarithmic surface 148 and linear surface 149. A sector gear 150, having a toothed surface 151, is pivotally mounted for arcuate reciprocation on a bushing 152 suitably affixed to plate 20. Cam follower 153 protrudes rearwardly from gear 150 and is adapted to operatively engage the periphery of cam 146. The gear is resiliently biased and the follower kept in contact with the cam surface by a spring 154, one end of which is anchored to a pin 155 and the other end of which is fastened through an aperture 156 in gear 150.

Pointer 126 is attached to a stub shaft 157 which is journalled through dial 124 and rotatably supported in an aperture 158 in the face of cam 147. Mounted on shaft 157 is a gear 159 which meshes with teeth 151.

Thus uniform rotation of shaft 32 and cam 147 causes motion of follower 153 which is at times a linear and at times a logarithmic function of shaft rotation. This arcuate reciprocal motion of follower 153 is translated into rotary motion by the coaction of gears 150 and 159. The dial 124 is suitably calibrated to coincide with the orientation, length and position of surfaces 148 and 149.

Although the invention has been described in considerable detail, such description is intended to be illustrative rather than limiting, since the invention may be variously embodied and its extent, consequently, is to be determined by the appended claims.

Having described my invention, I claim:

1. A servo system indicator-controller comprising a servo gear train; a pointer drive shaft driven by said gear train; rotational stops for said pointer drive shaft; biasing means urging said shaft against one of said stops; a fixed limit switch; means operating said fixed limit switch when said shaft is against one of said stops; a manually rotatable control shaft; a dial; a first dial pointer driven by said pointer drive shaft; a second pointer on said dial and positioned with respect thereto by rotation of said control shaft; an "on-off" switch operated by rotation of said control shaft; a variable limit switch; and means activating said variable limit switch as a combined function of the position of said pointer drive shaft and the setting of said second pointer.

2. A servo system indicator-controller comprising a servo gear train; a pointer drive shaft driven by said gear train; an ancillary gear train driven by said pointer shaft; rotational stops for said pointer shaft; angular biasing means resiliently urging said shaft against one of said stops; a fixed limit switch; fixed limit switch operating means activated by said servo gear train at one limit of pointer shaft rotation; a cam rotated by said ancillary gear train in proportion to motion of said pointer shaft; a manual control shaft; a limit set gear train operated by rotation of said control shaft; a variable limit switch, mounted on and rotated by said limit set gear train, including an operator which follows said ancillary gear train cam; an "on-off" switch; means operating said "on-off" switch upon rotation of said control shaft; a calibrated dial; a first dial pointer positioned by rotation of said control shaft; and a second dial pointer indicating the position of said pointer drive shaft.

3. The indicator-controller of claim 2 which further includes conversion means interposed between said pointer drive shaft and said second pointer causing motion of said pointer, with respect to said shaft, to be linear for a portion of shaft rotation and logarithmic for the balance of shaft rotation.

4. The indicator-controller of claim 2 which further includes a second "on-off" switch; bearing means permitting both rotation and reciprocation of said control shaft; means activating said second "on-off" switch upon reciprocation of said shaft and means reciprocally biasing said shaft.

5. The indicator-controller of claim 4 which further includes conversion means interposed between said pointer drive shaft and said second pointer causing motion of said pointer, with respect to said shaft, to be linear for a portion of shaft rotation and logarithmic for the balance of shaft rotation.

6. A servo system indicator-controller comprising a hollow longitudinally extending housing including a forward bezel support plate an intermediate bearing plate, a rear bearing plate, and means keeping said plates in transverse parallel spaced-apart relationship within said housing; a servo gear train, mounted within said housing between said rear and said intermediate bearing plates, including an input shaft torqued by a servo motor and an intermediate output shaft for driving a nulling potentiometer; a pointer drive shaft extending longitudinally within said housing and driven by said servo gear train; means limiting rotation of said pointer drive shaft; a fixed limit switch mounted within said housing proximate said pointer drive shaft; a switch operator fixedly mounted on said pointer drive shaft and rotating therewith which operates said fixed limit switch at a fixed rotational position of said drive shaft; means biasing said pointer drive shaft in a preferential direction when no torque is applied to the input shaft of said servo gear train, thereby causing operation of said fixed limit switch; an ancillary gear train, driven by said pointer drive shaft; a function transfer cam rotated by said ancillary gear train; a manually rotatable control shaft extending outwardly from said housing; rotational limits for said control shaft; a switch activating cam rotatably mounted in said housing; means rotating said cam upon rotation of said control shaft; a variable limit switch mounted on said cam, having an activator which follows the peripheral portions of said function transfer cam; an "on-off" switch mounted in said housing, having an activator which follows said switch activating cam; rotation of said control shaft away from one limit causing closure of said first "on-off" switch and also changing the angular position of said variable limit switch with respect to said function transfer cam; a face plate assembly spacedly mounted on said bezel plate including a calibrated dial; means illuminating said dial when both said fixed and said variable limit switches are closed; a range set dial pointer; means positioning said range set pointer upon rotation of said control shaft; a second dial pointer driven by said pointer drive shaft; a visible fail indicator, mechanically biased to give a fail indication except when electrically energized by closure of both fixed and variable limit switches; and a protective transparent dial cover including a masked sector; said range pointer reposing behind said masked sector when said switch activating cam is in its "off" position and said second pointer being urged toward said masked sector by said pointer drive shaft biasing means.

7. A servo system indicator-controller comprising a hollow longitudinally extending housing including a forward bezel support plate, an intermediate bearing plate, a rear bearing plate, and means keeping said plates in transverse parallel spaced-apart relationship within said housing; a servo gear train mounted within said housing between said rear and said intermediate bearing plates, including an input shaft, torqued by a servo motor, and an intermediate output shaft, for driving a nulling potentiometer; a pointer drive shaft extending longitudinally within said housing and driven by said servo gear train; means limiting rotation of said pointer drive shaft; a fixed limit switch mounted within said housing; a switch operator, activated by said servo gear train, which operates said fixed limit switch at a fixed rotational position of said pointer drive shaft; means biasing said pointer drive shaft in a preferential direction when no torque is applied to the input shaft of said servo gear train, thereby causing operation of said fixed limit switch; an ancillary gear train, driven by said pointer drive shaft; a function transfer cam, rotated by said ancillary gear train; a manually rotatable control shaft extending outwardly through said housing; rotational limits for said shaft; a switch activating cam rotatably mounted in said housing; means rotating said cam upon rotation of said control shaft; a variable limit switch, mounted on said cam, having an activator which follows the peripheral portions of said function transfer cam; an "on-off" switch mounted in said housing, having an activator which follows said switch activating cam; rotation of said control shaft away from one limit causing actuation of said "on-off" switch and also changing the angular position of said variable limit switch with respect to said function transfer cam; a face plate assembly spacedly mounted on said bezel plate including a calibrated dial; means illuminating said dial when both said fixed and said variable limit switches are closed; a range set dial pointer; means positioning said range set pointer upon rotation of said control shaft; a second dial pointer driven by said pointer drive shaft; a visible fail indicator mechanically biased to give a fail indication except when electrically energized by closure of both fixed and variable limit switches; and a protective transparent dial cover including a masked sector; said range pointer reposing behind said masked sector when said switch activating cam is in its "off" position and said second pointer being urged toward said masked sector by said pointer drive shaft biasing means.

8. A servo system indicator-controller comprising a hollow longitudinally extending housing including a forward bezel support plate, an intermediate bearing plate, a rear bearing plate, and means keeping said plates in transverse parallel spaced-apart relationship within said housing; a servo gear train mounted within said housing, between said rear and said intermediate bearing plates, including an input shaft torqued by a servo motor and an intermediate output shaft for driving a nulling potentiometer; a pointer drive shaft extending longitudinally within said housing and driven by said servo gear train; means limiting rotation of said pointer drive shaft to substantially one revolution thereof; a normally-closed fixed limit switch mounted within said housing, proximate said pointer drive shaft; a switch operator fixedly mounted on said pointer and rotating therewith which actuates said limit switch at an extreme of pointer drive shaft rotation; spring loaded biasing means for rotating said servo gear train and returning said pointer drive shaft to an extreme rotational position, whereby operation of said fixed limit switch is effected, when no torque is applied to the input shaft of said servo gear train; an ancillary gear train, driven by said pointer drive shaft, located within said housing between said bezel support plate and said intermediate support plate; a function transfer cam, including a raised peripheral portion and a flat peripheral portion, which flat portion extends for an arcuate distance equal to the distance the cam turns for one revolution of the pointer drive shaft; a manually rotatable control shaft extending outwardly through said housing; rotational limits for said shaft; a switch activating cam rotatably mounted in said housing; means rotating said cam upon rotation of said control shaft; a variable limit switch mounted on said cam, having an activator which follows the peripheral portions of said function transfer cam; a first "on-off" switch mounted in said housing, having an activator which follows said switch activating cam; rotation of said control shaft away from one limit causing closure of said first "on-off" switch and also changing the angular position of said variable limit switch with respect to said function transfer cam; a face plate assembly spacedly mounted on said bezel plate including a calibrated dial; means illuminating said dial when both said fixed and said variable limit switches are closed; a range set dial pointer; means positioning said range set pointer upon rotation of said control shaft; a second pointer, driven by said pointer drive shaft; a visible fail indicator mechanically biased to give a fail indication except when electrically energized by closure of both fixed and variable limit switches; and a protective transparent dial cover including a masked sector; said range pointer reposing behind said masked sector when said switch activating cam is in its "off" position and said second pointer being urged toward said masked sector by said pointer drive shaft biasing means.

9. The indicator of claim 8 wherein conversion means are interposed between said pointer drive shaft and said second pointer which cause the relationship between shaft rotation and pointer rotation to be linear over a portion of the dial scale and logarithmic over the remainder of the dial scale.

10. The indicator-controller of claim 8 which further includes a second "on-off" switch; bearings permitting both rotation and reciprocation of said control shaft; means activating said second "on-off" switch at one extreme of control shaft reciprocation and means reciprocally biasing said shaft.

11. A servo system indicator controller comprising servo drive means; a dial; a first pointer rotatably mounted with respect to said dial; a nulling potentiometer including a shaft whose angular position determines the effective electrical resistance of said potentiometer; means coupling said servo drive means to said shaft producing rotation thereof and varying the effective resistance of said potentiometer; means coupling said shaft to said first pointer to produce rotation thereof; a first switch; means operating said first switch only when said first pointer is at a fixed position on the dial; a second pointer on said dial; a second switch; a manual positioner which simultaneously positions said second pointer with respect to said dial and sets the operating limits of said second switch; an operator for said second switch; and means activating said second switch operator as a function of the position of said first pointer, said second switch being activated only when said first pointer is within the operating limits set by said manual positioner.

12. The indicator controller of claim 11 which further includes an "on-off" switch; an operator for said switch which is activated by said manual positioner; and means masking said second pointer when said switch is in "off" position.

References Cited by the Examiner

UNITED STATES PATENTS

| | | | |
|---|---|---|---|
| 2,450,287 | 9/1948 | Macintyre | 200—38 |
| 2,830,142 | 4/1958 | Smith | 200—38 |
| 2,920,155 | 1/1960 | Corocran | 200—56 |

BERNARD A. GILHEANY, *Primary Examiner.*

T. D. MACBLAIN, *Assistant Examiner.*